United States Patent
Chen

(10) Patent No.: US 12,089,224 B2
(45) Date of Patent: Sep. 10, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 361 days.

(21) Appl. No.: 17/504,157

(22) Filed: Oct. 18, 2021

(65) Prior Publication Data

US 2022/0053468 A1 Feb. 17, 2022

Related U.S. Application Data

(63) Continuation of application No. PCT/CN2019/083544, filed on Apr. 19, 2019.

(51) Int. Cl.
*H04W 72/23* (2023.01)
*H04L 5/00* (2006.01)
*H04W 72/20* (2023.01)

(52) U.S. Cl.
CPC .......... *H04W 72/23* (2023.01); *H04L 5/0053* (2013.01); *H04W 72/20* (2023.01)

(58) Field of Classification Search
CPC .... H04W 72/23; H04W 72/20; H04L 5/0094; H04L 5/0035; H04L 5/0053
See application file for complete search history.

(56) References Cited

U.S. PATENT DOCUMENTS

| | | | | |
|---|---|---|---|---|
| 11,212,736 B2* | 12/2021 | Xu | ........................ | H04W 48/12 |
| 11,323,992 B2* | 5/2022 | Zhuang | ............... | H04W 72/044 |
| 11,804,924 B2* | 10/2023 | Hang | ................... | H04L 1/0038 |
| 2010/0279628 A1 | 11/2010 | Love et al. | | |
| 2018/0309560 A1 | 10/2018 | Tang | | |
| 2022/0053468 A1* | 2/2022 | Chen | ..................... | H04L 5/0035 |

FOREIGN PATENT DOCUMENTS

| | | |
|---|---|---|
| CN | 102395206 A | 3/2012 |
| CN | 108366413 A | 8/2018 |
| CN | 108811116 A | 11/2018 |
| CN | 109347611 A | 2/2019 |
| WO | 2013114632 A1 | 8/2013 |

(Continued)

OTHER PUBLICATIONS

International Search Report issued in corresponding International Application No. PCT/CN2019/083544, mailed Jan. 16, 2020, 27 pages.

(Continued)

*Primary Examiner* — Raj Jain
(74) *Attorney, Agent, or Firm* — BAYES PLLC

(57) ABSTRACT

Embodiments of the present disclosure provide a wireless communication method, a terminal device and a network device. The method includes determining, by the terminal device, a plurality of search spaces for transmitting same DCI; and detecting, by the terminal device, the DCI in the plurality of search spaces.

18 Claims, 6 Drawing Sheets

(56) References Cited

FOREIGN PATENT DOCUMENTS

| WO | 2013127453 A1 | 9/2013 |
|---|---|---|
| WO | 2019244223 A1 | 12/2019 |

OTHER PUBLICATIONS

PCT Written Opinion of the International Searching Authority issued in corresponding International Application No. PCT/CN2019/083544, mailed Jan. 16, 2020, 3 pages.
"Remaining aspects of CA operation", Agenda Item: 7.3.4.2, Source: CATT, 3GPP TSG RAN WG1 Meeting #90bis, R1-1717840, Prague, CZ, Oct. 9-13, 2017, 4 pages.
NTT Docomo, Inc, "Enhancements on multi-TRP/panel transmission", R1-1904966, 3GPP TSG RAN WG1 #96bis Xi'an, China, Apr. 8-12, 2019.
3GPP TS 38.213 V15.5.0 (Mar. 2019); Technical Specification Group Radio Access Network; NR; Physical layer procedures for control (Release 15).
First Office Action issued in corresponding Chinese application No. 202211116152.9, mailed Aug. 16, 2023.
3GPP TSG RAN WG1 Meeting #62; R1-104703; Madrid, Spain, Aug. 23-Aug. 27, 2010 Source: Motorola; Title: Further details on Search space design for PDCCH with CIF.
3GPP TSG RAN WG1 Meeting #68; R1-120752; Dresden, Germany, Feb. 6-10, 2012 Source: Fujitsu; Title: Search Space Design for Downlink Control Channel.
1 Notice of Allowance issued in corresponding European application No. 19925473.1, mailed Dec. 7, 2022.
"NR DL Control Channel Structure", Source: ZTE, ZTE Microelectronics, 3GPP TSG RAN WG1 Meeting #88, R1-1701585, Athens, Greece, Feb. 13-17, 2017, 8 pages.
Extended European Search Report issued in corresponding European Application No. 19925473.1, mailed Mar. 22, 2022, 11 pages.

* cited by examiner

WIRELESS COMMUNICATION METHOD, TERMINAL DEVICE AND NETWORK DEVICE

CROSS-REFERENCE TO RELATED APPLICATION

This application is a continuation of International Application No. PCT/CN2019/083544, filed on Apr. 19, 2019, the entire contents of which are hereby incorporated by reference.

BACKGROUND

Embodiments of the present disclosure relate to the field of communication, and more particularly, to a wireless communication method, terminal device and network device.

In a New Radio (NR) system, a terminal device determines a resource for detecting a physical downlink control channel (PDCCH) through a control resource set (CORESET) and a search space configured by a network device, and the terminal device needs to detect downlink control information (DCI) independently according to a configuration parameter in each configured search space. In order to ensure reliable transmission of control information, the network device may transmit the same DCI in different search spaces. However, if the DCI is still detected independently, it will affect the reliability of PDCCH transmission.

SUMMARY

Embodiments of the present disclosure provide a wireless communication method, terminal device, and network device.

A first aspect provides a wireless communication method including determining, by a terminal device, a plurality of search spaces for transmitting same DCI; and detecting, by the terminal device, the DCI in the plurality of search spaces.

A second aspect provides a wireless communication method including determining, by a network device, a plurality of search spaces for transmitting same DCI; and transmitting, by the network device, the DCI in the plurality of search spaces respectively.

A third aspect provides a terminal device which is configured to execute the method in the above first aspect or each of implementation manners thereof.

Specifically, the terminal device includes a functional module for executing the method in the above first aspect or each of implementation manners thereof.

A fourth aspect provides a network device which is configured to execute the method in the above second aspect or each of implementation manners thereof.

Specifically, the network device includes a functional module for executing the method in the above second aspect or each of implementation manners thereof.

A fifth aspect provides a terminal device including a processor and a memory. The memory is configured to store a computer program, and the processor is configured to call and run the computer program stored in the memory to execute the method in the above first aspect or each of implementation manners thereof.

A sixth aspect provides a network device including a processor and a memory. The memory is configured to store a computer program, and the processor is configured to call and run the computer program stored in the memory to execute the method in the above second aspect or each of implementation modes thereof.

A seventh aspect provides an apparatus configured to implement the method in any one of the above first to second aspects or each of implementation manners thereof.

Specifically, the apparatus includes a processor, configured to call and run a computer program from a memory, so that a device installed with the apparatus executes the method in any one of the above first to second aspects or each of implementation manners thereof.

An eighth aspect provides a computer-readable storage medium configured to store a computer program that enables a computer to execute the method in any one of the above first to second aspects or each of implementation manners thereof.

A ninth aspect provides a computer program product including computer program instructions that cause a computer to execute the method in any one of the above first to second aspects or each of implementation manners thereof.

A tenth aspect provides a computer program that, when running on a computer, causes the computer to execute the method in any one of the above first to second aspects or each of implementation manners thereof.

DETAILED DESCRIPTION

The technical solutions in the embodiments of the present disclosure will be described below in conjunction with the drawings in the embodiments of the present disclosure. Obviously, the described embodiments are a part but not all of the embodiments of the present disclosure. Based on the embodiments in the present disclosure, all other embodiments obtained by those skilled in the art without creative work shall fall within the protection scope of the present disclosure.

The embodiments of the present disclosure may be applied to various communication systems, such as global system of mobile communication (GSM) system, code division multiple access (CDMA) system, wideband code division multiple access (WCDMA) system, general packet radio service (GPRS), long term evolution (LTE) system, advanced long term evolution (LTE-A) system, new radio (NR) system, NR system evolution system, LTE-based access to unlicensed spectrum (LTE-U) system, NR-based access to unlicensed spectrum (NR-U) system, universal mobile telecommunication system (UMTS), wireless local area network (WLAN), wireless fidelity (WiFi), next-generation communication system or other communication systems, and the like.

Generally, a traditional communication system supports a limited number of connections and is easy to be implemented. However, with the development of communication technology, a mobile communication system not only supports traditional communication, but also supports, for example, device to device (D2D) communication, machine to machine (M2M) communication, machine type communication (MTC), vehicle to vehicle (V2V) communication and the like. The embodiments of the present disclosure may also be applied to these communication systems.

Optionally, the communication system in the embodiments of the present disclosure may be applied to a carrier aggregation (CA) scenario, may also be applied to a dual connectivity (DC) scenario, and may further be applied to a standalone (SA) network deployment scenario.

The applied frequency spectrum is not limited in the embodiments of the present disclosure. For example, the embodiments of the present disclosure may be applied to a licensed spectrum or an unlicensed spectrum.

Figure 1:
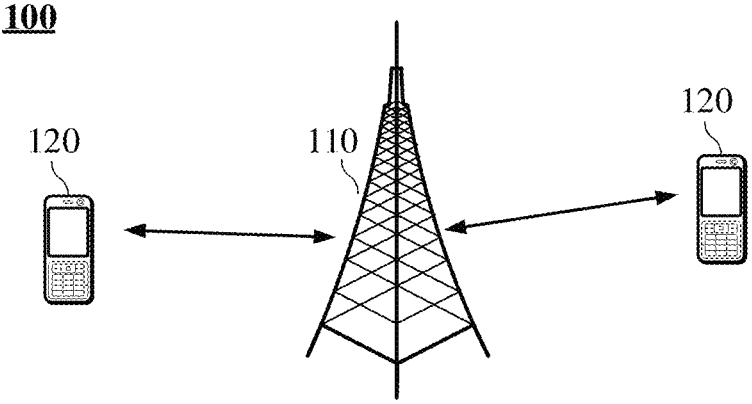
FIG. 1 is a schematic diagram of a communication system architecture according to an embodiment of the present disclosure.

Exemplarily, a communication system 100 applied in an embodiment of the present disclosure is shown in FIG. 1. The communication system 100 may include a network device 110. The network device 110 may be a device that communicates with a terminal device 120 (or referred to as a communication terminal or a terminal). The network device 110 may provide communication coverage for a specific geographic area, and may communicate with the terminal device located in the coverage area.

FIG. 1 exemplarily shows one network device and two terminal devices. Optionally, the communication system 100 may include a plurality of network devices, and the coverage of each network device may include other numbers of terminal devices, which is not limited in the embodiment of the present disclosure.

Optionally, the communication system 100 may further include other network entities such as a network controller and a mobility management entity, which is not limited in the embodiment of the present disclosure.

It shall be understood that a device with a communication function in the network/system in the embodiments of the present disclosure may be referred to as a communication device. By taking the communication system 100 shown in FIG. 1 as an example, the communication device may include the network device 110 and the terminal device 120 with the communication function. The network device 110 and the terminal device 120 may specifically be the devices described above, which will not be repeated herein. The communication device may also include other devices in the communication system 100, such as a network controller, a mobility management entity, and the like, which is not limited in the embodiments of the present disclosure.

It shall be understood that the terms "system" and "network" are often used interchangeably herein. The term "and/or" herein is merely an association relationship describing associated objects, indicating that there may be three relationships. For example, A and/or B may indicate that A exists alone, both A and B exist, and B exists alone. In addition, the character "/" herein generally indicates that associated objects before and after the same are in an "or" relationship.

In the embodiments of the present disclosure, various embodiments are described in conjunction with the terminal device and network device. The terminal device may also be referred to as user equipment (UE), access terminal, user unit, user station, mobile radio station, mobile station, remote station, remote terminal, mobile device, user terminal, terminal, wireless communication device, user agent, user device or the like. The terminal device may be a station (ST) in WLAN, cell phone, cordless phone, session initiation protocol (SIP) phone, wireless local loop (WLL) station, personal digital assistant (PDA) device, handheld device with wireless communication function, computing device or other processing devices connected to wireless modem, in-vehicle device, wearable device, and terminal device in next-generation communication system such as NR network or future public land mobile network (PLMN) network.

As an example but not a limitation, in the embodiments of the present disclosure, the terminal device may also be a wearable device. The wearable device may also be called a wearable smart device. It is an umbrella term of a device that can be worn and is developed by intelligently designing daily wear with the application of wearable technology, such as glasses, gloves, watches, clothing and shoes. The wearable device is a portable device that is directly worn on the body or integrated into user's clothes or accessories. The wearable device is not only a kind of hardware device, but also realize powerful functions through software support, data interaction, and cloud interaction. In a broad sense, the wearable smart device may be full-featured and large-sized and may achieve complete or partial functions without relying on a smart phone, such as smart watches or smart glasses; or only focus on a certain type of application function, and needs to cooperate with other devices such as smart phones, such as smart bracelets and smart jewelry for physical sign monitoring.

The network device may be a device for communicating with a mobile device. The network device may be an access point (AP) in WLAN, a base transceiver station (BTS) in GSM or CDMA, a NodeB (NB) in WCDMA, an evolutional Node B (eNB, or eNodeB) in LTE, a relay station or access point, a vehicle-mounted device, a wearable device, a network device or base station (gNB) in NR network, or a network device in future evolved PLMN network.

In the embodiments of the present application, the network device provides service for a cell, and the terminal device communicates with the network device through transmission resources (for example, frequency domain resources, or spectrum resources) used by the cell. The cell may be a cell corresponding to a network device (for example, a base station). The cell may belong to a macro base station or a base station corresponding to a small cell. The small cell here may include metro cell, micro cell, pico cell, femto cell and the like. These small cells have the characteristics of small coverage and low transmitting power, and are suitable for providing services with high data transmission rate.

It shall be understood that in a NR system, a terminal device determines a resource for detecting PDCCH through a CORESET and a search space configured by a network device. The CORESET is configured to determine a size of a frequency domain resource (such as the number of occupied physical resource blocks (PRB)) and a size of a time domain resource (such as the number of occupied orthogonal frequency division multiplexing (OFDM) symbols) of the PDCCH in a time slot, and includes a starting position of the frequency domain resource, a length of the frequency domain resource, a length of the time domain resource and the like. The search space is configured to determine a time domain resource location of the PDCCH, and includes a starting location and a monitoring periodicity of the time domain resource. According to the configuration of one COSRESET and one search space, the terminal device may determine the physical resource location for detecting the PDCCH.

Figure 2:
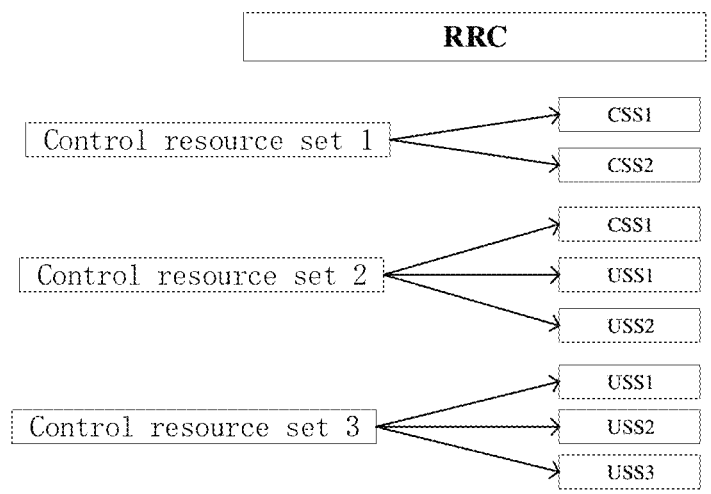
FIG. 2 is a schematic diagram of a corresponding relationship between a control resource set and a search space according to an embodiment of the present disclosure.

For example, the network device configures up to three CORESETs through high-level signaling, and each CORESET has a CORESET identity (ID). At the same time, the network device may also configure at least one search space through the high-level signaling, and the configuration parameter of each search space includes ID of an associated CORESET, aggregation level, search space type and the like. Each search space may only be associated with one CORESET, but one CORESET may be associated with a plurality of search spaces, as shown in FIG. 2. The search space type includes a configuration of whether the search space is a common search space (CSS) or a UE search space (USS), and a DCI format that the terminal needs to detect in the search space. If the search space is CSS, the search space type in the search space is configured as Common, and the corresponding DCI format to be detected includes at least one of DCI format 2_0, DCI format 2_1, DCI format 2_2, DCI format 2_3, DCI format 0_0, and DCI format 1_0, that is, the DCI is generally configured to schedule the transmission of control information. If the search space is USS, the corresponding DCI format that needs to be detected includes DCI format 0_0 and DCI format 1_0 (formats0-0-And-1-0), or includes DCI format 0_1 and DCI format 1_1 (formats0-1-And-1-1), that is, the DCI is generally configured to schedule uplink or downlink data transmission.

Figure 3:
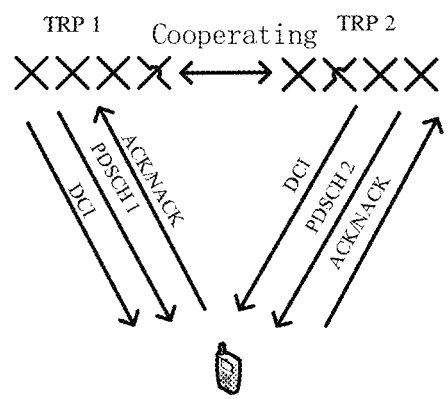
FIG. 3 is a schematic diagram of a downlink non-coherent transmission according to an embodiment of the present disclosure.
Figure 4:
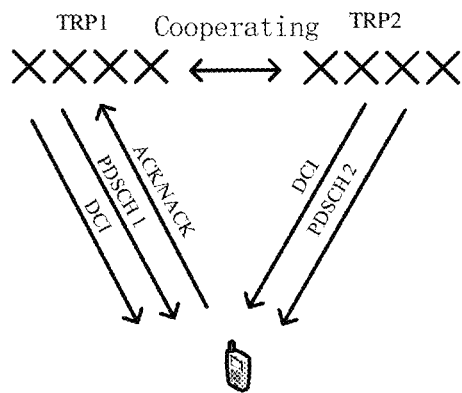
FIG. 4 is a schematic diagram of another downlink non-coherent transmission according to an embodiment of the present disclosure.

It shall be understood that in the NR system, incoherent transmission of downlink and uplink based on a plurality of TRPs is introduced. Backhaul connection between TRPs may be ideal or non-ideal. Under the ideal backhaul, TRPs may exchange information quickly and dynamically. Under the non-ideal backhaul, TRPs can only exchange information in a quasi-static manner due to a large delay. In downlink non-coherent transmission, a plurality of TRPs may use different control channels to independently schedule a physical downlink shared channel (PDSCH) transmission of one terminal, and the scheduled PDSCH may be transmitted in the same time slot or in different time slots. The terminal needs to support simultaneous reception of PDCCH and PDSCH from different TRPs. When the terminal feeds back acknowledgement (ACK)/negative acknowledgement (NACK), the ACK/NACK may be fed back respectively to different TRPs that transmit the corresponding PDSCH, as shown in FIG. 3, or may be combined to be reported to one TRP, as shown in FIG. 4. That the ACK/NACK is fed back respectively to different TRPs that transmit the corresponding PDSCH may be applied to both the ideal backhaul and non-ideal backhaul scenarios; and that the ACK/NACK is combined to be reported to one TRP can only be applied to the ideal backhaul scenario. The PDSCHs sent by different TRPs may carry the same data, so that the transmission reliability of the PDSCHs may be further improved through the diversity transmission of the plurality of TRPs. At this time, the terminal only needs to report one ACK/NACK for a plurality of PDSCHs carrying the same data. DCI used for scheduling PDSCHs and transmitted by different TRPs may be carried by different CORESETs, that is, a plurality of CORESETs are configured on the network side, and each TRP uses its own CORESET for scheduling.

Figure 5:
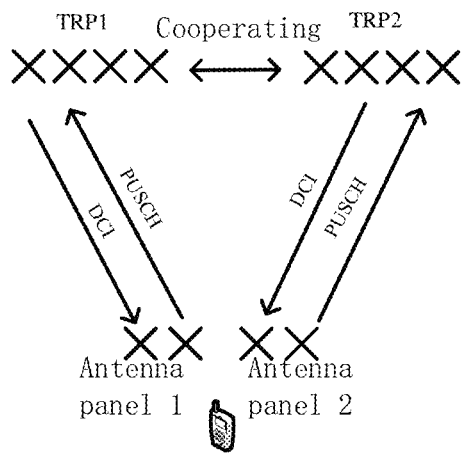
FIG. 5 is a schematic diagram of an uplink non-coherent transmission according to an embodiment of the present disclosure.
Figure 6:
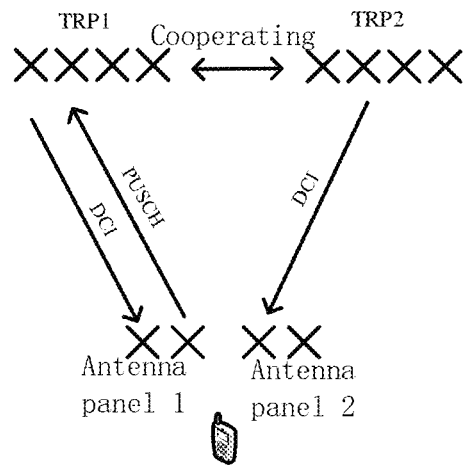
FIG. 6 is a schematic diagram of another uplink non-coherent transmission according to an embodiment of the present disclosure.

In uplink non-coherent transmission, different TRPs may also independently schedule PUSCH transmission of the same terminal. Different PUSCH transmissions may be configured with independent transmission parameters, such as beam, precoding matrix, number of layers. The scheduled PUSCH transmission may be transmitted in the same time slot or different time slots. If two PUSCH transmissions are scheduled for the terminal at the same time in the same time slot, it needs to determine how to transmit according to its own capabilities. If the terminal is configured with a plurality of antenna panels and supports simultaneous transmission of PUSCH on the plurality of panels, it may transmit these two physical uplink shared channels (PUSCH) at the same time, and the PUSCH transmitted on different panels aligns a corresponding TRP to perform analog beamforming, thereby distinguishing different PUSCHs through the spatial domain, and providing uplink spectral efficiency, as shown in FIG. 5. If the terminal has only a single panel, or does not support simultaneous transmission of a plurality of panels, the PUSCH can only be transmitted on one panel, as shown in FIG. 6. The DCI used for scheduling PUSCH and transmitted by different TRPs may be carried by different CORESETs, that is, a plurality of CORESETs are configured on the network side, and each TRP uses its own CORESET for scheduling.

At this stage, the control information transmitted in different search spaces is different, and the terminal needs to perform DCI detection independently according to a configuration parameter in each configured search space. However, in subsequent communications, a network device may transmit the same DCI in different search spaces. Since the terminal cannot know which search spaces transmit the same DCI, it can only perform independent detection, thereby failing to obtain combined gain, and affecting the reliability of PDCCH transmission.

In view of the above problems, the present disclosure provides a DCI transmission manner, which may improve the reliability of PDCCH transmission.

The DCI transmission method provided by the present disclosure in view of the above technical problems will be described in detail below.

Figure 7:
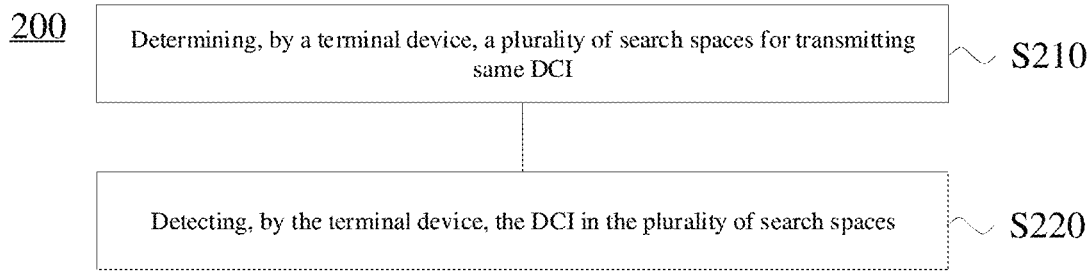
FIG. 7 is a schematic flowchart of a wireless communication method according to an embodiment of the present disclosure.

FIG. 7 is a schematic flowchart of a wireless communication method 200 according to an embodiment of the present disclosure. As shown in FIG. 7, the method 200 may include, S210, determining, by a terminal device, a plurality of search spaces for transmitting same DCI; and S220, detecting, by the terminal device, the DCI in the plurality of search spaces.

That is, the terminal device may detect the same DCI in the plurality of search spaces.

Optionally, in an embodiment of the present disclosure, the plurality of search spaces includes at least one same parameter of: a monitoring periodicity, a time slot offset, a duration, a number of PDCCH candidates, a search space type, and an aggregation level.

That is, the terminal device may detect the DCI in the plurality of search spaces based on one or more of the monitoring periodicity, the time slot offset, the duration, the number of PDCCH candidates, the search space type, and the aggregation level.

For example, provided that the plurality of search spaces include a first search space and a second search space, the first search space and the second search space may be configured with the same monitoring period, duration, aggregation level and search space type.

Optionally, in an embodiment of the present disclosure, configurations of time slot offsets (time slot offset configurations) of the plurality of search spaces have a first association, and/or configurations of initial OFDM symbols (initial OFDM symbol configurations) of the plurality of search spaces have a second association.

Optionally, the first association is specifically that the configurations of the time slot offsets of the plurality of search spaces indicate continuous time slots.

Figure 8:
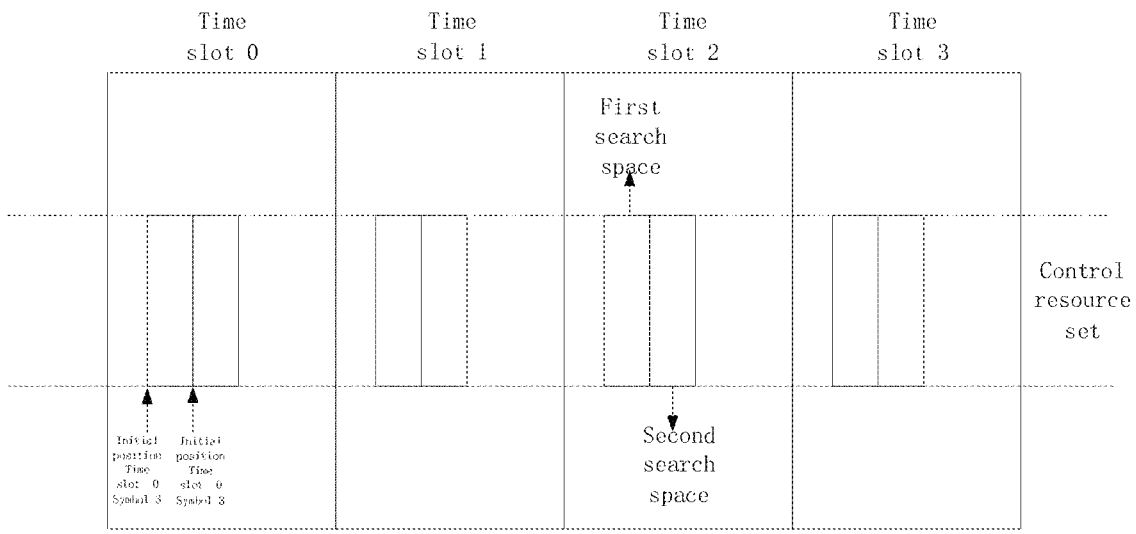
FIG. 8 is a schematic diagram of a search space according to an embodiment of the present disclosure.

For example, provided that the plurality of search spaces include a first search space and a second search space, the time slot offset configurations (offsets) of the first search space and the second search space are the same, and the initial OFDM symbol configuration indicates two adjacent OFDM symbols, as shown in FIG. 8, or may also indicate other two non-adjacent OFDM symbols in the same time slot.

For another example, provided that the plurality of search spaces include a first search space and a second search space, the first search space and the second search space have the same starting time slot, and the time slot offset configuration of the second search space=the time slot offset configuration of the first search space+1, so that the time slots of the first search space and the second search space are continuous.

For another example, provided that the plurality of search spaces include a first search space and a second search space, the first search space and the second search space have the same starting time slot, and the time slot offset configuration of the second search space=the time slot offset configuration of the first search space−1, so that the time slots of the first search space and the second search space are continuous.

For another example, provided that the plurality of search spaces include a first search space and a second search space, the starting time slot of the second search space=the starting time slot of the first search space+1, and the first search space and the second search space have the same time slot offset configuration, so that the time slots of the first search space and the second search space are continuous.

For another example, provided that the plurality of search spaces include a first search space and a second search space, the starting time slot of the second search space=the starting time slot of the first search space−1, and the first search space and the second search space have the same time slot offset configuration, so that the time slots of the first search space and the second search space are continuous.

It should be noted that, when the time slots of the first search space and the second search space are continuous, the symbols occupied by the first search space and the second search space may or may not be adjacent.

Optionally, the first association is specifically that the time slot offset configurations of the plurality of search spaces indicate discontinuous or partially continuous time slots.

For example, provided that the plurality of search spaces include a first search space and a second search space, the time slot offset configurations of the first search space and the second search space are not the same, and initial OFDM symbol configuration indicates two adjacent or non-adjacent OFDM symbols, thereby indicating discontinuous or partially continuous time slots.

Optionally, the second association is specifically that the configurations of the initial OFDM symbols of the plurality of search spaces indicate continuous initial OFDM symbols.

For example, provided that the plurality of search spaces include a first search space and a second search space, the first and second search spaces have the same initial OFDM symbol configuration, so that the OFDM symbols of the first search space and the second search space are continuous.

For another example, provided that the plurality of search spaces include a first search space and a second search space, the first search space and the second search space have the same initial OFDM symbol, and the initial OFDM symbol configuration of the second search space=the initial OFDM symbol configuration of the first search space+1, so that the OFDM symbols of the first search space and the second search space are continuous.

For another example, provided that the plurality of search spaces include a first search space and a second search space, the first search space and the second search space have the same initial OFDM symbol, and the initial OFDM symbol configuration of the second search space=the initial OFDM symbol configuration of the first search space−1, so that the OFDM symbols of the first search space and the second search space are continuous.

For another example, provided that the plurality of search spaces include a first search space and a second search space, the initial symbol of the second search space=the initial symbol of the first search space+1, and the first search space and the second search space have the same initial OFDM symbol configuration, so that the OFDM symbols of the first search space and the second search space are continuous.

For another example, provided that the plurality of search spaces include a first search space and a second search space, the initial symbol of the second search space=the initial symbol of the first search space−1, and the first search space and the second search space have the same initial OFDM symbol configuration, so that the OFDM symbols of the first search space and the second search space are continuous.

It should be noted that when the OFDM symbols of the first search space and the second search space are continuous, the time slots of the first search space and the second search space may be continuous or discontinuous.

Optionally, the second association is specifically that the initial OFDM symbol configurations of the plurality of search spaces indicates discontinuous or partially continuous OFDM symbols.

For example, provided that the plurality of search spaces include a first search space and a second search space, the first search space and the second search space have different initial OFDM symbol configurations, and the time slot offset configuration indicates two adjacent or non-adjacent time slots, thereby indicating discontinuous or partially continuous OFDM symbols.

Optionally, the first association and/or the second association are pre-configured or configured by the network device.

Optionally, in an embodiment of the present disclosure, some or all of the plurality of search spaces occupy different time domain resources.

Optionally, in an embodiment of the present disclosure, the plurality of search spaces occupy different time domain resources.

For example, the time domain resources occupied by the plurality of search spaces are partly different, for example, the time domain resources occupied by the plurality of search spaces have at least one different symbol or time slot.

For another example, the time domain resources occupied by the plurality of search spaces are completely different.

Optionally, in an embodiment of the present disclosure, at least one of the plurality of search spaces includes a repetition parameter configuration (repetition), and the repetition parameter configuration is configured for the terminal device to determine the number of the plurality of search spaces.

For example, provided that the plurality of search spaces include a first search space, and the repetition parameter configuration included in the first search space may indicate the number of repetition transmissions of the DCI transmitted in the first search space, that is, the number of search spaces in which the DCI is transmitted. For example, the repetition parameter configuration may indicate 2 transmissions.

Optionally, in an embodiment of the present disclosure, the plurality of search spaces are associated with different CORESETs, or the plurality of search spaces are associated with CORESETs in different CORESET groups.

Specifically, the network device may configure a plurality of CORESETs for the terminal device. For example, the network device configures the plurality of CORESETs through radio resource control (RRC) signaling, and configures a CORESET group identity for each CORESET to identify the CORESET group to which the CORESET belongs. If the group identities of two CORESETs are the same, the two CORESETs are considered to belong to the same CORESET group. If the group identities of two CORESETs are different, the two CORESETs are considered to belong to different CORESET groups. Alternatively, the network device may configure a plurality of CORESET groups for the terminal device through RRC signaling, and each CORESET group includes one or more CORESETs. In an embodiment of the present disclosure, provided that the plurality of search spaces include a first search space and a second search space, the CORESET group identities (CORESET group IDs) configured by the CORESET associated with the first search space and the second search space are different, or the respective associated CORESETs of the first search space and the second search space are configured in different CORESET groups. For example, the first search space is associated with a first CORESET, and the second search space is associated with a second CORESET, and the CORESET group identity indications in the first CORESET and the second CORESET are different.

Optionally, the plurality of search spaces have the same index in search spaces which are associated with respective CORESETs associated the plurality of search spaces.

Optionally, in an embodiment of the present disclosure, step S210 may specifically include determining, by the terminal device, a second search space that transmits the same DCI as a first search space according to search space identity information included in the first search space, wherein the first search space and the second search space belong to the plurality of search spaces.

In other words, in addition to the search space ID of the first search space, the parameters of the first search space include another associated search space ID, and the associated search space ID indicates the second search space associated with the first search space.

Optionally, the first search space may be a special search space, for example, the search space with the smallest or largest search space identity is the first search space.

Optionally, the first search space may also be a search space indicated or configured by the network device.

Optionally, the first search space is a search space agreed or pre-configured by a protocol.

Optionally, in an embodiment of the present disclosure, step S220 may specifically include combining, by the terminal device, PDCCH signals in the plurality of search spaces, and detecting the DCI in a combined PDCCH signal; or respectively detecting, by the terminal device, the DCI in the plurality of search spaces until the DCI is detected.

For example, the terminal device combines PDCCH signals with the same PDCCH candidate index in the plurality of search spaces.

For another example, the terminal device combines PDCCH signals with a predefined correspondence in the plurality of search spaces.

Optionally, the above PDCCH signal combining manner may be soft-combining.

Provided that the plurality of search spaces include a first search space and a second search space, the PDCCH signal in the first search space is the first PDCCH, and the PDCCH signal in the second search space is the second PDCCH, and the above predefined correspondence may be, for example, that the frequency domain resources occupied by the first PDCCH and the second PDCCH are the same, or the numbers of control channel elements (CCE) occupied by the first PDCCH and the second PDCCH are the same.

Optionally, provided that the plurality of search spaces include a first search space and a second search space, the terminal device may also detect the DCI in the first search space and the second search space respectively, as long as the DCI is detected in one of the search spaces, the corresponding DCI detection is stopped, and subsequent processing is performed according to the detected DCI.

Optionally, in an embodiment of the present disclosure, the terminal device detects the DCI in the plurality of search spaces by using different receiving beams.

First Embodiment

The terminal device determines that the first search space and the second search space transmit the same DCI. In addition to the search space ID of the first search space, the parameters of the first search space include another associated search space ID. The associated search space ID indicates the second search space associated with the first search space. The terminal determines that the first search space and the associated second search space transmit the same DCI, as shown in FIG. 8.

Optionally, the terminal device may further determine the number of repetition transmissions of the DCI transmitted in the first search space, i.e., the number of search spaces in which the DCI is transmitted, according to the repetition number configuration (repetition) included in the configuration parameter of the first search space. In the first embodiment, the repetition number configuration may indicate 2 transmissions.

Optionally, in the first embodiment, the first search space and the second search space are configured with the same monitoring periodicity, duration, aggregation level, and search space type.

Optionally, in an implementation of the first embodiment, the time slot offset configurations (offsets) of the first search space and the second search space are the same, but the initial OFDM symbol configurations indicate two adjacent OFDM symbols, as shown in FIG. 8, or may indicate other two non-adjacent OFDM symbols in the same time slot.

Optionally, in another implementation of the first embodiment, the initial OFDM symbol configurations of the first search space and the second search space are the same, but the time slot offset configurations indicate two adjacent slots, or may indicate two non-adjacent time slots.

Optionally, in the first embodiment, the terminal device jointly detects the DCI in the first search space and the second search space.

Specifically, the terminal device performs soft-combining on the PDCCH signals in the first search space and the second search space, and then performs the DCI detection.

Specifically, the terminal device performs soft-combining on a first PDCCH in the first search space and a second PDCCH in the second search space, and then performs the DCI detection. The first PDCCH and the second PDCCH have a predefined correspondence. For example, the frequency domain resources occupied by the first PDCCH and the second PDCCH are the same, or the numbers of CCEs occupied by the first PDCCH and the second PDCCH are the same.

Optionally, in the first embodiment, the terminal device may also detect the DCI in the first search space and the second search space respectively. As long as the DCI is detected in one of the search spaces, the corresponding DCI detection is stopped, and a subsequent processing is performed according to the detected DCI.

Second Embodiment

Figure 9:
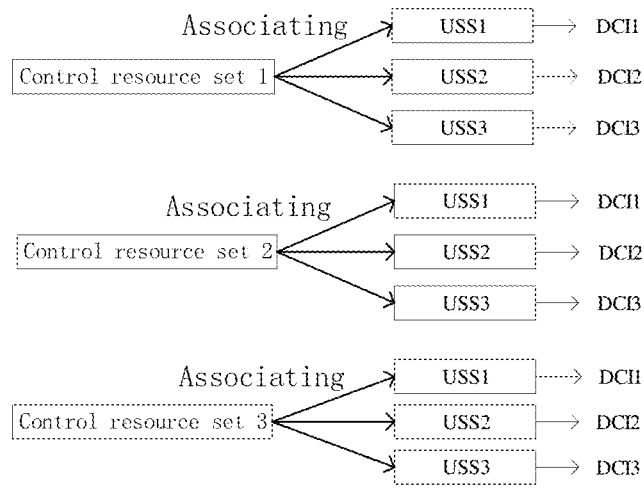
FIG. 9 is a schematic diagram of a control channel configuration according to an embodiment of the present disclosure.

The terminal device receives configuration of N CORESETs for DCI repetition transmission, and each CORESET is associated with M search spaces, that is, the number of search spaces associated with each CORESET is the same, and M and N are positive integers. The terminal device assumes that in the M search spaces associated with each of the N CORESETs, N search spaces with the same index transmit the same DCI. For example, the first search space associated with each CORESET transmits the same DCI, the second search space associated with each CORESET transmits the same DCI, and so on. The index of one search space in the M search spaces associated with one CORESET may be obtained according to the rank of the search space IDs. For example, the M search spaces are ranked according to the rank from the small to large search space IDs, thereby obtaining a first, second, . . . , an M-th search space. For example, FIG. 9 shows M=N=3.

Optionally, in the second embodiment, different CORESETs independently configure the transmission configuration indicator (TCI) state.

Optionally, in the second embodiment, in addition to the CORESET ID of the CORESET, the parameter of the CORESET may include another one or more associated CORESET IDs, and the associated CORESET ID indicates another one or more CORESETs associated with the CORESET. The terminal device may assume that the search spaces associated with the plurality of CORESETs transmit the same DCI.

Optionally, in the second embodiment, N search spaces that transmit the same DCI are configured with the same monitoring periodicity, duration, time slot offset configuration (offset), and search space type. The aggregation levels of the N search spaces may be the same or different, which is not limited herein.

Optionally, in the second embodiment, the N search spaces occupy different time domain resources, for example, occupy different OFDM symbols. At this time, when the terminal device detects the same DCI in the search spaces associated with the N CORESETs, different receiving beams may be used for detection, thereby improving the detection success rate.

It should be noted that in the second embodiment, since the same control information is transmitted in the N search spaces, the N search spaces that transmit the same DCI may also be referred to as N repetitions of one search space, and the N CORESETs that transmit the same DCI may also be referred to N repetitions of one CORESET.

Optionally, in the second embodiment, the terminal device jointly detects the DCI in the N CORESETs and the N search spaces that transmit the same DCI.

Specifically, the terminal device performs soft-combining on the PDCCH signals in the N search spaces, and then performs the DCI detection.

Specifically, the terminal device may use different receiving beams to receive the N CORESETs and the same DCI transmitted in the N search spaces associated with the N CORESETs.

Optionally, in the second embodiment, the terminal device combines PDCCH signals with the same PDCCH candidate index in the N search spaces associated with the N CORESETs, and then performs the DCI detection. For example, provided that the aggregation levels of the M search spaces are all 8, that is, each search space includes 8 PDCCH candidates. Then the terminal device combines the first PDCCH candidates of the respective N search spaces, and then combines the second PDCCH candidates of the respective N search spaces, and so on, until the DCI is detected, or until all PDCCH candidates are detected.

Therefore, in the embodiment of the present disclosure, the network device may use different search spaces to transmit the same DCI on different TRPs, and the terminal device combines the PDCCHs detected on a plurality of search spaces and then detects the same, thereby improving the transmission reliability performance of the PDCCH.

Figure 10:
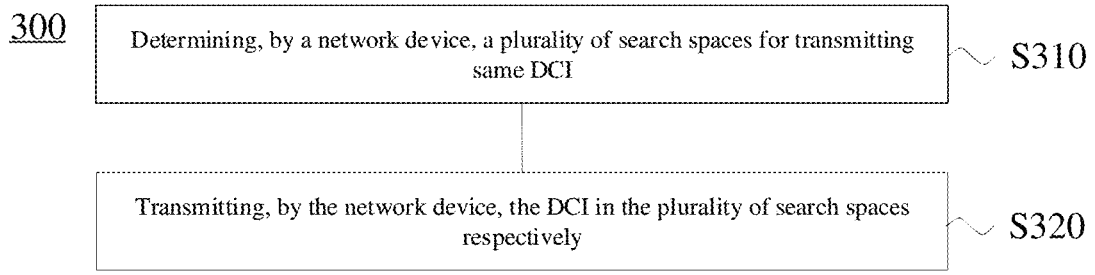
FIG. 10 is a schematic flowchart of another wireless communication method according to an embodiment of the present disclosure.

FIG. 10 is a schematic flowchart of a wireless communication method 300 according to an embodiment of the present disclosure. As shown in FIG. 10, the method 300 may include, S310, determining, by a network device, a plurality of search spaces for transmitting same downlink control information (DCI); and S320, transmitting, by the network device, the DCI in the plurality of search spaces respectively.

That is, the network device sends the same DCI in the plurality search spaces.

Optionally, in an embodiment of the present disclosure, the plurality of search spaces includes at least one same parameter of: a monitoring periodicity, a time slot offset, a duration, a number of PDCCH candidates, a search space type, and an aggregation level.

Optionally, in an embodiment of the present disclosure, configurations of time slot offsets (time slot offset configurations) of the plurality of search spaces have a first association, and/or configurations of initial OFDM symbols (initial OFDM symbol configurations) of the plurality of search spaces have a second association.

Optionally, the first association is specifically that the configurations of the time slot offsets of the plurality of search spaces indicate continuous time slots.

For example, provided that the plurality of search spaces include a first search space and a second search space, the time slot offset configurations (offsets) of the first search space and the second search space are the same, and the initial OFDM symbol configuration indicates two adjacent OFDM symbols, as shown in FIG. 8, or may also indicate other two non-adjacent OFDM symbols in the same time slot.

For another example, provided that the plurality of search spaces include a first search space and a second search space, the first search space and the second search space have the same starting time slot, and the time slot offset configuration of the second search space=the time slot offset configuration of the first search space+1, so that the time slots of the first search space and the second search space are continuous.

For another example, provided that the plurality of search spaces include a first search space and a second search space, the first search space and the second search space have the same starting time slot, and the time slot offset configuration of the second search space=the time slot offset configuration of the first search space−1, so that the time slots of the first search space and the second search space are continuous.

For another example, provided that the plurality of search spaces include a first search space and a second search space, the starting time slot of the second search space=the starting time slot of the first search space+1, and the first search space and the second search space have the same time slot offset configuration, so that the time slots of the first search space and the second search space are continuous.

For another example, provided that the plurality of search spaces include a first search space and a second search space, the starting time slot of the second search space=the starting time slot of the first search space−1, and the first search space and the second search space have the same time slot offset configuration, so that the time slots of the first search space and the second search space are continuous.

It should be noted that, when the time slots of the first search space and the second search space are continuous, the symbols occupied by the first search space and the second search space may or may not be adjacent.

Optionally, the first association is specifically that the time slot offset configurations of the plurality of search spaces indicate discontinuous or partially continuous time slots.

For example, provided that the plurality of search spaces include a first search space and a second search space, the time slot offset configurations of the first search space and the second search space are not the same, and initial OFDM symbol configuration indicates two adjacent or non-adjacent OFDM symbols, thereby indicating discontinuous or partially continuous time slots.

Optionally, the second association is specifically that the configurations of the initial OFDM symbols of the plurality of search spaces indicate continuous initial OFDM symbols.

For example, provided that the plurality of search spaces include a first search space and a second search space, the first and second search spaces have the same initial OFDM symbol configuration, so that the OFDM symbols of the first search space and the second search space are continuous.

For another example, provided that the plurality of search spaces include a first search space and a second search space, the first search space and the second search space have the same initial OFDM symbol, and the initial OFDM symbol configuration of the second search space=the initial OFDM symbol configuration of the first search space+1, so that the OFDM symbols of the first search space and the second search space are continuous.

For another example, provided that the plurality of search spaces include a first search space and a second search space, the first search space and the second search space have the same initial OFDM symbol, and the initial OFDM symbol configuration of the second search space=the initial OFDM symbol configuration of the first search space−1, so that the OFDM symbols of the first search space and the second search space are continuous.

For another example, provided that the plurality of search spaces include a first search space and a second search space, the initial symbol of the second search space=the initial symbol of the first search space+1, and the first search space and the second search space have the same initial OFDM symbol configuration, so that the OFDM symbols of the first search space and the second search space are continuous.

For another example, provided that the plurality of search spaces include a first search space and a second search space, the initial symbol of the second search space=the initial symbol of the first search space−1, and the first search space and the second search space have the same initial OFDM symbol configuration, so that the OFDM symbols of the first search space and the second search space are continuous.

It should be noted that when the OFDM symbols of the first search space and the second search space are continuous, the time slots of the first search space and the second search space may be continuous or discontinuous.

Optionally, the second association is specifically that the initial OFDM symbol configurations of the plurality of search spaces indicates discontinuous or partially continuous OFDM symbols.

For example, provided that the plurality of search spaces include a first search space and a second search space, the first search space and the second search space have different initial OFDM symbol configurations, and the time slot offset configuration indicates two adjacent or non-adjacent time slots, thereby indicating discontinuous or partially continuous OFDM symbols.

Optionally, the first association and/or the second association are pre-configured or configured by the network device.

Optionally, in an embodiment of the present disclosure, some or all of the plurality of search spaces occupy different time domain resources.

Optionally, in an embodiment of the present disclosure, the plurality of search spaces occupy different time domain resources.

For example, the time domain resources occupied by the plurality of search spaces are partly different, for example, the time domain resources occupied by the plurality of search spaces have at least one different symbol or time slot.

For another example, the time domain resources occupied by the plurality of search spaces are completely different.

Optionally, in an embodiment of the present disclosure, at least one of the plurality of search spaces includes a repetition parameter configuration, and the repetition parameter configuration is configured for the terminal device to determine the number of the plurality of search spaces.

For example, provided that the plurality of search spaces include a first search space, and the repetition parameter configuration included in the first search space may indicate the number of repetition transmissions of the DCI transmitted in the first search space, that is, the number of search spaces in which the DCI is transmitted. For example, the repetition parameter configuration may indicate 2 transmissions.

Optionally, in an embodiment of the present disclosure, the plurality of search spaces are associated with different CORESETs, or the plurality of search spaces are associated with CORESETs in different CORESET groups.

Specifically, the network device may configure a plurality of CORESETs for the terminal device. For example, the network device configures the plurality of CORESETs through RRC signaling, and configures a CORESET group identity for each CORESET to identify the CORESET group to which the CORESET belongs. If the group identities of two CORESETs are the same, the two CORESETs are considered to belong to the same CORESET group. If the group identities of two CORESETs are different, the two CORESETs are considered to belong to different CORESET groups. Alternatively, the network device may configure a plurality of CORESET groups for the terminal device through RRC signaling, and each CORESET group includes one or more CORESETs. In an embodiment of the present disclosure, provided that the plurality of search spaces include a first search space and a second search space, the CORESET group identities (CORESET group IDs) configured by the CORESET associated with the first search space and the second search space are different, or the respective associated CORESETs of the first search space and the second search space are configured in different CORESET groups. For example, the first search space is associated with a first CORESET, and the second search space is associated with a second CORESET, and the CORESET group identity indications in the first CORESET and the second CORESET are different.

Optionally, the plurality of search spaces have the same index in search spaces which are associated with respective CORESETs associated the plurality of search spaces.

Optionally, in this embodiment of the present disclosure, step S310 may specifically include configuring, by the network device, a plurality of CORESETs each associated with at least one search space; and determining, by the network device, search spaces with a first index in search spaces associated with the plurality of CORESETs as the plurality of search spaces.

Optionally, in an embodiment of the present disclosure, step S320 may specifically include transmitting, by the network device, the DCI in the plurality of search spaces respectively through different TRPs or different antenna panels.

First Embodiment

The network device determines that two TRPs are used to transmit the same DCI respectively. The DCI transmitted on TRP1 belongs to a first search space, and the DCI transmitted on TRP2 belongs to a second search space, that is, the first search space and the second search space transmit the same DCI. In addition to the search space ID of the first search space, the parameters of the first search space include another associated search space ID. The associated search space ID indicates the second search space associated with the first search space.

Optionally, in the first embodiment, the network device may further include a repetition number configuration (repetition) in configuration parameters of the first search space, and the parameter is configured to indicate the number of repetition transmissions of the DCI transmitted in the first search space, i.e., the number of search spaces in which the DCI is transmitted. In this embodiment, the repetition number configuration may indicate 2 transmissions.

Optionally, in the first embodiment, the network device configures the first search space and the second search space with the same monitoring periodicity, duration, aggregation level, and search space type.

Optionally, in an implementation of the first embodiment, the time slot offset configurations (offsets) of the first search space and the second search space are the same, but the initial OFDM symbol configurations indicate two adjacent OFDM symbols, as shown in FIG. 8, or may indicate other two non-adjacent OFDM symbols in the same time slot.

Optionally, in another implementation of the first embodiment, the initial OFDM symbol configurations of the first search space and the second search space are the same, but the time slot offset configurations indicate two adjacent slots, or may indicate two non-adjacent time slots.

Optionally, in the first embodiment, the network device transmits the same DCI through TRP1 and TRP2 in the first search space and the second search space, respectively.

Second Embodiment

The network device configures N CORESETs for DCI repetition transmission, and each CORESET is associated with M search spaces, that is, the number of search spaces associated with each CORESET is the same, and M and N are positive integers.

Specifically, in the M search spaces associated with each of the N CORESETs, N search spaces with the same index transmit the same DCI. For example, the first search space associated with each CORESET transmits the same DCI, the second search space associated with each CORESET transmits the same DCI, and so on. The index of one search space in the M search spaces associated with one CORESET may be obtained according to the rank of the search space IDs. For example, the M search spaces are ranked according to the rank from the small to large search space IDs, thereby obtaining a first, second, . . . , an M-th search space. For example, FIG. 9 shows M=N=3.

Specifically, in the second embodiment, different CORESETs may be transmitted through the same TRP or panel, or through different TRPs or panels. Provided that different CORESETs are transmitted through different TRPs or panels, different CORESETs are independently configured with different TCIs.

Optionally, in the second embodiment, in addition to the CORESET ID of the CORESET, the parameter of the CORESET may include another one or more associated CORESET IDs, and the associated CORESET ID indicates another one or more CORESETs associated with the CORESET.

Optionally, in the second embodiment, the network device configures N search spaces that transmit the same DCI with the same monitoring periodicity, duration, time slot offset configuration (offset), and search space type. The aggregation levels of the N search spaces may be the same or different, which is not limited herein.

Optionally, in the second embodiment, the N search spaces occupy different time domain resources, for example, occupy different OFDM symbols.

Optionally, in the second embodiment, the network device transmits the same DCI in the N CORESETs and the N search spaces, respectively.

Specifically, the network device transmits the N CORESETs and the N search spaces associated with the N CORESETs through different TRPs or panels.

Therefore, in the embodiment of the present application, the network device may use different search spaces to transmit the same DCI on different TRPs, and the terminal device combines the PDCCHs detected on the plurality of search spaces and then detects the same, thereby improving the transmission reliability of the PDCCH.

Figure 11:
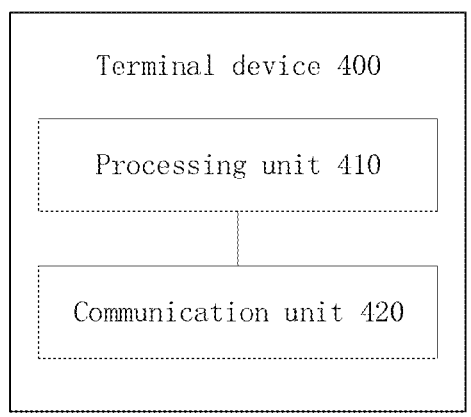
FIG. 11 is a schematic block diagram of a terminal device according to an embodiment of the present disclosure.

FIG. 11 shows a schematic block diagram of a terminal device 400 according to an embodiment of the present disclosure. As shown in FIG. 11, the terminal device 400 includes a processing unit 410, configured to determine a plurality of search spaces for transmitting same DCI; and a communication unit 420, configured to detect the DCI in the plurality of search spaces.

Optionally, the plurality of search spaces includes at least one same parameter of a monitoring periodicity, a time slot offset, a duration, a number of PDCCH candidates, a search space type, and an aggregation level.

Optionally, configurations of time slot offsets of the plurality of search spaces have a first association, and/or configurations of initial OFDM symbols of the plurality of search spaces have a second association.

Optionally, the first association and/or the second association are pre-configured or configured by a network device.

Optionally, the first association is specifically that the configurations of the time slot offsets of the plurality of search spaces indicate continuous time slots.

Optionally, the second association is specifically that the configurations of the initial OFDM symbols of the plurality of search spaces indicate continuous initial OFDM symbols.

Optionally, the plurality of search spaces occupy different time domain resources.

Optionally, the plurality of search spaces are associated with different CORESETs, or the plurality of search spaces are associated with CORESETs of different CORESET groups.

Optionally, the plurality of search spaces have a same index in search spaces which are associated with respective CORESETs associated the plurality of search spaces.

Optionally, at least one of the plurality of search spaces includes a repetition parameter configuration, and the repetition parameter configuration is configured for the terminal device to determine a number of the plurality of search spaces.

Optionally, the processing unit 410 is specifically configured to determine a second search space that transmits the same DCI as a first search space according to search space identity information included in the first search space, wherein the first search space and the second search space belong to the plurality of search spaces.

Optionally, the communication unit 420 is specifically configured to detect the DCI in the plurality of search spaces by using different receiving beams.

Optionally, the communication unit 420 is specifically configured to combine PDCCH signals in the plurality of search spaces, and detect the DCI in a combined PDCCH signal; or respectively detect the DCI in the plurality of search spaces until the DCI is detected.

Optionally, the communication unit 42 is specifically configured to combine PDCCH signals with a same PDCCH candidate index in the plurality of search spaces; or combine PDCCH signals with a predefined correspondence in the plurality of search spaces.

It should be understood that the terminal device 400 according to the embodiment of the present application may correspond to the terminal device in the method embodiment of the present disclosure, and the above and other operations and/or functions of each unit in the terminal device 400 are to implement the corresponding process of the terminal device in the method 200 shown in FIG. 7 respectively, which will not be repeated here for the sake of brevity.

Figure 12:
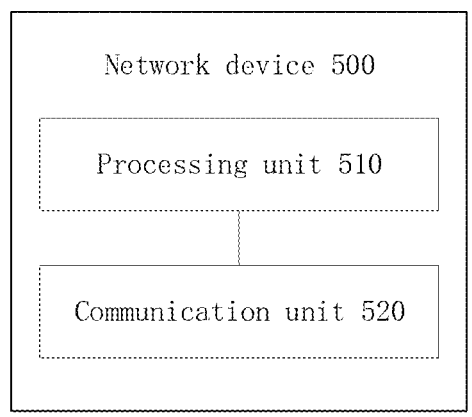
FIG. 12 is a schematic block diagram of a network device according to an embodiment of the present disclosure.

FIG. 12 shows a schematic block diagram of a network device 500 according to an embodiment of the present disclosure. As shown in FIG. 12, the network device 500 includes a processing unit 510, configured to determine a plurality of search spaces for transmitting same DCI; and a communication unit 520, configured to transmit the DCI in the plurality of search spaces respectively.

Optionally, the plurality of search spaces includes at least one same parameter of a monitoring periodicity, a time slot offset, a duration, a number of PDCCH candidates, a search space type, and an aggregation level.

Optionally, configurations of time slot offsets of the plurality of search spaces have a first association, and/or configurations of initial OFDM symbols of the plurality of search spaces have a second association.

Optionally, the first association and/or the second association are pre-configured or configured by the network device.

Optionally, the first association is specifically that the configurations of the time slot offsets of the plurality of search spaces indicate continuous time slots.

Optionally, the second association is specifically that the configurations of the initial OFDM symbols of the plurality of search spaces indicate continuous initial OFDM symbols.

Optionally, the plurality of search spaces occupy different time domain resources.

Optionally, the plurality of search spaces are associated with different CORESETs, or the plurality of search spaces are associated with CORESETs of different CORESET groups.

Optionally, at least one of the plurality of search spaces includes a repetition parameter configuration, and the repetition parameter configuration is configured for a terminal device to determine a number of the plurality of search spaces.

Optionally, the processing unit 510 is specifically configured to configure a plurality of CORESETs each associated with at least one search space; and determine search spaces with a first index of search spaces respectively associated with the plurality of CORESETs as the plurality of search spaces.

Optionally, the communication unit 520 is specifically configured to transmit the DCI in the plurality of search spaces respectively through different TRPs or different antenna panels.

It should be understood that the network device 500 according to the embodiment of the present application may correspond to the network device in the method embodiment of the present disclosure, and the above and other operations and/or functions of each unit in the network device 500 are to implement the corresponding process of the network device in the method 300 shown in FIG. 10 respectively, which will not be repeated here for the sake of brevity.

Figure 13:
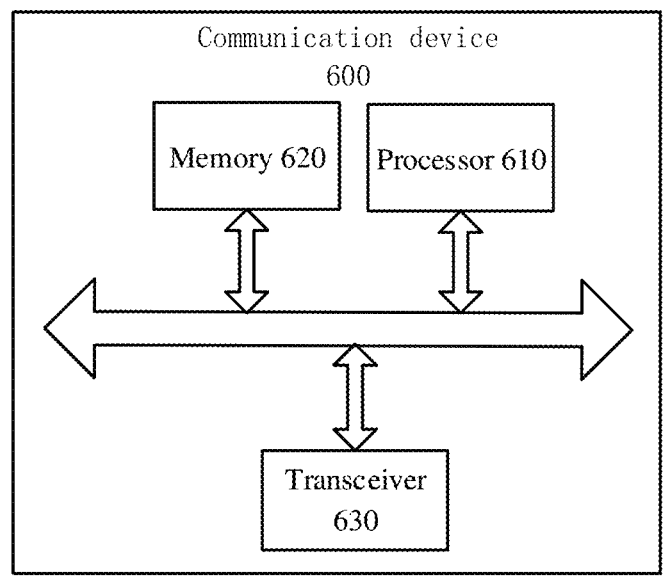
FIG. 13 is a schematic block diagram of a communication device according to an embodiment of the present disclosure.

FIG. 13 is a schematic structural diagram of a communication device 600 according to an embodiment of the present disclosure. The communication device 600 shown in FIG. 13 includes a processor 610, and the processor 610 may call and run a computer program from the memory to implement the method in the embodiment of the present disclosure.

Optionally, as shown in FIG. 13, the communication device 600 may further include a memory 620. The processor 610 may call and run a computer program from the memory 620 to implement the method in the embodiment of the present disclosure.

The memory 620 may be a separate device from the processor 610, or may be integrated in the processor 610.

Optionally, as shown in FIG. 13, the communication device 600 may further include a transceiver 630, and the processor 610 may control the transceiver 630 to communicate with other devices. Specifically, it may send information or data to other devices, or receive information or data sent by other devices.

The transceiver 630 may include a transmitter and a receiver. The transceiver 630 may further include an antenna, and the number of antennas may be one or more.

Optionally, the communication device 600 may specifically be the network device in the embodiment of the present disclosure, and the communication device 600 may implement the corresponding processes implemented by the network device in each method of the embodiment of the present disclosure. For the sake of brevity, details thereof are not repeated herein.

Optionally, the communication device 600 may specifically be the mobile terminal/terminal device in the embodiment of the present disclosure, and the communication device 600 may implement the corresponding processes implemented by the mobile terminal/terminal device in each method of the embodiment of the present disclosure. For the sake of brevity, details thereof are not repeated herein.

Figure 14:
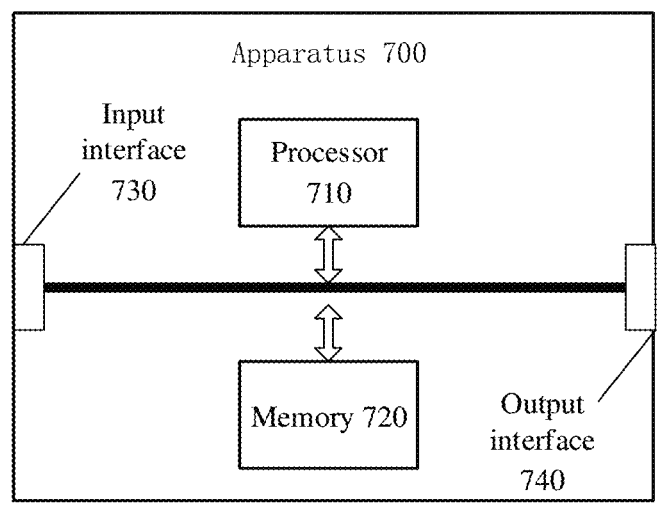
FIG. 14 is a schematic block diagram of an apparatus according to an embodiment of the present disclosure.

FIG. 14 is a schematic structural diagram of an apparatus according to an embodiment of the present disclosure. The apparatus 700 shown in FIG. 14 includes a processor 710, and the processor 710 may call and run a computer program from a memory to implement the method in the embodiment of the present disclosure.

Optionally, as shown in FIG. 14, the apparatus 700 may further include a memory 720. The processor 710 may call and run a computer program from the memory 720 to implement the method in the embodiment of the present disclosure.

The memory 720 may be a separate device from the processor 710, or may be integrated in the processor 710.

Optionally, the apparatus 700 may further include an input interface 730. The processor 710 may control the input interface 730 to communicate with other devices or chips, and specifically, may obtain information or data sent by other devices or chips.

Optionally, the apparatus 700 may further include an output interface 740. The processor 710 may control the output interface 740 to communicate with other devices or chips, and specifically, may output information or data to other devices or chips.

Optionally, the apparatus may be applied to the network device in the embodiment of the present disclosure, and the apparatus may implement the corresponding processes implemented by the network device in each method of the embodiment of the present disclosure. For the sake of brevity, details thereof are not repeated herein.

Optionally, the apparatus may be applied to the mobile terminal/terminal device in the embodiment of the present disclosure, and the apparatus may implement the corresponding processes implemented by the mobile terminal/ terminal device in each method of the embodiment of the present disclosure. For the sake of brevity, details thereof are not repeated herein.

Optionally, the apparatus mentioned in the embodiment of the present disclosure may also be a chip. For example, it may be a system-level chip, a system chip, a chip system, or a system-on-chip.

Figure 15:
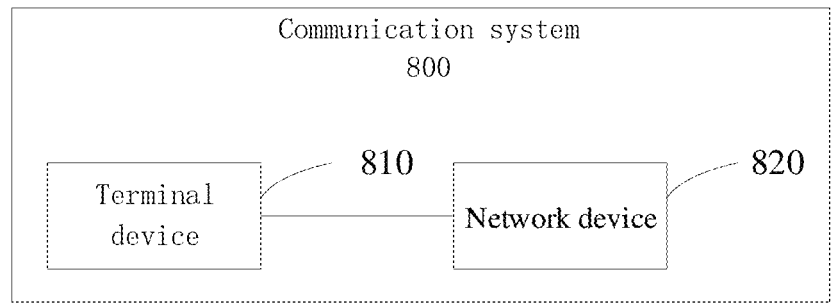
FIG. 15 is a schematic block diagram of a communication system according to an embodiment of the present disclosure.

FIG. 15 is a schematic block diagram of a communication system 800 according to an embodiment of the present disclosure. As shown in FIG. 15, the communication system 800 includes a terminal device 810 and a network device 820.

The terminal device 810 may implement corresponding functions implemented by the terminal device in the foregoing method, and the network device 820 may implement corresponding functions implemented by the network device in the foregoing method. For brevity, details thereof are not described herein again.

It shall be understood that, the processor of the embodiments of the present disclosure may be an integrated circuit chip, and have a signal processing capability. In implementation, the steps of the foregoing method embodiment may be implemented by using a hardware integrated logic circuit in the processor and/or implemented by using an instruction in a software form. The foregoing processor may be a general purpose processor, a digital signal processor (DSP), an application specific integrated circuit (ASIC), a field programmable gate array (FPGA) or another programmable logic device, a discrete gate or transistor logic device, or a discrete hardware component. The respective methods, steps or logic blocks disclosed in the embodiments of the present disclosure may be achieved or executed. The general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method in combination with hardware of the processor.

It shall be understood that, the memory in the embodiments of the present disclosure may be a volatile memory or a non-volatile memory, or may include both the volatile memory and non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DR RAM). It shall be noted that, the memory of the system and the method described herein is intended to include but not be limited to these memories and any other suitable type of memory.

It shall be understood that, the above memory is an example but is not intended for limitation. For example, the memory in the embodiments of the present disclosure may be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in the embodiments of the present disclosure is intended to include but not be limited to these memories and any other suitable type of memory.

An embodiment of the present disclosure further provides a computer readable storage medium for storing a computer program.

Optionally, the computer readable storage medium may be applied to the network device in the embodiment of the present disclosure, and the computer program enables a computer to execute a corresponding process implemented by the network device in each method of the embodiment of the present disclosure. For brevity, details thereof are not described herein again.

Optionally, the computer readable storage medium may be applied to the mobile terminal/terminal device in the embodiment of the present disclosure, and the computer program enables a computer to execute a corresponding process implemented by the mobile terminal/terminal device in each method of the embodiment of the present disclosure. For brevity, details thereof are not described herein again.

An embodiment of the present disclosure further provides a computer program product including a computer program instruction.

Optionally, the computer program product may be applied to the network device in the embodiment of the present disclosure, and the computer program instruction enables a computer to execute a corresponding process implemented by the network device in each method of the embodiment of the present disclosure. For brevity, details thereof are not described herein again.

Optionally, the computer program product may be applied to the mobile terminal/terminal device in the embodiment of the present disclosure, and the computer program instruction enables a computer to execute a corresponding process implemented by the mobile terminal/terminal device in each method of the embodiment of the present disclosure. For brevity, details thereof are not described herein again.

An embodiment of the present disclosure further provides a computer program.

Optionally, the computer program may be applied to the network device in the embodiment of the present disclosure, and the computer program, when running on a computer, enables the computer to execute a corresponding process implemented by the network device in each method of the embodiment of the present disclosure. For brevity, details thereof are not described herein again.

Optionally, the computer program may be applied to the mobile terminal/terminal device in the embodiment of the present disclosure, and the computer program, when running on a computer, enables the computer to execute a corresponding process implemented by the mobile terminal/terminal device in each method of the embodiment of the present disclosure. For brevity, details thereof are not described herein again.

A person of ordinary skill in the art may be aware that, units and algorithm steps described in combination with examples of the embodiments disclosed herein may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, which should not be considered that the implementation goes beyond the scope of the present disclosure.

A person skilled in the art may clearly understand that, for simple and clear description, specific working processes of the foregoing described system, device, and unit may refer to corresponding process in the foregoing method embodiments, and details thereof are not described herein again.

In the several embodiments provided in the present disclosure, it shall be understood that the disclosed system, device, and method may be implemented in other manners. For example, the device embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electrical, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for wireless communication, comprising:
   determining, by a terminal device according to an associated search space ID, a pair of associated search spaces from a plurality of search spaces, wherein the pair of associated search spaces are for transmitting same downlink control information (DCI) from at least one network device; and
   detecting, by the terminal device, the DCI in the pair of associated search spaces,
   wherein determining, by the terminal device according to the associated search space ID, the pair of associated search spaces from the plurality of search spaces comprises:
   determining, by the terminal device, a second search space associated with a first search space according to the associated search space ID in the first search space, wherein the associated search space ID is an additional parameter other than a search space ID of the first search space which indicates the second search space associated with the first search space.

2. The method according to claim 1, wherein the pair of associated search spaces comprise at least one same parameter of:
   a monitoring periodicity, a time slot offset, a duration, a number of physical downlink control channel (PDCCH) candidates, a search space type, and an aggregation level.

3. The method according to claim 1, wherein:
   configurations of time slot offsets of the pair of associated search spaces have a first association, and/or
   configurations of initial orthogonal frequency-division multiplexing (OFDM) symbols of the pair of associated search spaces have a second association.

4. The method according to claim 3, wherein at least one of the first association or the second association is pre-configured or configured by the at least one network device.

5. The method according to claim 1, wherein the pair of associated search spaces are associated with different control resource sets (CORESETs), or the pair of associated search spaces are associated with CORESETs of different CORESET groups.

6. The method according to claim 1, wherein detecting, by the terminal device, the DCI in the pair of associated search spaces comprises:
   detecting, by the terminal device, the DCI in the pair of associated search spaces by using different receiving beams.

7. The method according to claim 1, wherein detecting, by the terminal device, the DCI in the pair of associated search spaces comprises:
   combining, by the terminal device, PDCCH signals in the pair of associated search spaces, and detecting the DCI in a combined PDCCH signal; or
   respectively detecting, by the terminal device, the DCI in the pair of associated search spaces until the DCI is detected.

8. The method according to claim 7, wherein combining, by the terminal device, the PDCCH signals in the pair of associated search spaces comprises:
   combining, by the terminal device, PDCCH signals with a same PDCCH candidate index in the pair of associated search spaces; or
   combining, by the terminal device, PDCCH signals with a predefined correspondence in the pair of associated search spaces.

9. A terminal device, comprising a processor and a memory having a computer program stored thereon, wherein the processor is configured to call and run the computer program stored in the memory to execute a wireless communication method comprising:
   determining, by the terminal device according to an associated search space ID, a pair of associated search spaces from a plurality of search spaces, wherein the pair of associated search spaces are for transmitting same downlink control information (DCI) from at least one network device; and
   detecting, by the terminal device, the DCI in the pair of associated search spaces,
   wherein determining, by the terminal device according to the associated search space ID, the pair of associated search spaces from the plurality of search spaces comprises:
   determining, by the terminal device, a second search space associated with a first search space according to the associated search space ID in the first search space, wherein the associated search space ID is an additional parameter other than a search space ID of the first search space which indicates the second search space associated with the first search space.

10. The terminal device according to claim 9, wherein the pair of associated search spaces comprise at least one same parameter of:
    a monitoring periodicity, a time slot offset, a duration, a number of physical downlink control channel (PDCCH) candidates, a search space type, and an aggregation level.

11. The terminal device according to claim 9, wherein:
    configurations of time slot offsets of the pair of associated search spaces have a first association, and/or
    configurations of initial orthogonal frequency-division multiplexing (OFDM) symbols of the pair of associated search spaces have a second association.

12. The terminal device according to claim 11, wherein at least one of the first association or the second association are pre-configured or configured by the at least one network device.

13. The terminal device according to claim 9, wherein the pair of associated search spaces are associated with different control resource sets (CORESETs), or the pair of associated search spaces are associated with CORESETs of different CORESET groups.

14. The terminal device according to claim 9, wherein detecting, by the terminal device, the DCI in the pair of associated search spaces comprises:
    detecting, by the terminal device, the DCI in the pair of associated search spaces by using different receiving beams.

15. The terminal device according to claim 9, wherein detecting, by the terminal device, the DCI in the pair of associated search spaces comprises:
    combining, by the terminal device, PDCCH signals in the pair of associated search spaces, and detecting the DCI in a combined PDCCH signal; or
    respectively detecting, by the terminal device, the DCI in the pair of associated search spaces until the DCI is detected.

16. The terminal device according to claim 15, wherein combining, by the terminal device, the PDCCH signals in the pair of associated search spaces comprises:
    combining, by the terminal device, PDCCH signals with a same PDCCH candidate index in the pair of associated search spaces; or combining, by the terminal device, PDCCH signals with a predefined correspondence in the pair of associated search spaces.

17. A network device, comprising a processor and a memory having a computer program stored thereon, wherein the processor is configured to call and run the computer program stored in the memory to execute a wireless communication method comprising:

determining, by the network device, a pair of associated search spaces for transmitting same downlink control information (DCI), wherein the pair of associated search spaces are for transmitting the same downlink control information (DCI) from the network device; and transmitting, by the network device, the DCI in the pair of associated search spaces respectively, wherein a first search space of the pair of associated search spaces comprises an associated search space ID, and the associated search space ID is an additional parameter other than a search space ID of the first search space which indicates a second search space of the pair of associated search spaces associated with the first search space.

18. The network device according to claim 17, wherein the pair of associated search spaces comprise at least one same parameter of:

a monitoring periodicity, a time slot offset, a duration, a number of physical downlink control channel (PDCCH) candidates, a search space type, and an aggregation level.

* * * * *